(12) United States Patent
Cho et al.

(10) Patent No.: US 9,134,566 B2
(45) Date of Patent: Sep. 15, 2015

(54) LIQUID CRYSTAL DISPLAY DEVICE

(71) Applicant: LG DISPLAY CO., LTD., Seoul (KR)

(72) Inventors: Sukho Cho, Paju-si (KR); Sehwan Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 14/141,577

(22) Filed: Dec. 27, 2013

(65) Prior Publication Data

US 2015/0062506 A1    Mar. 5, 2015

(30) Foreign Application Priority Data

Sep. 2, 2013    (KR) .......... 10-2013-0104763

(51) Int. Cl.
*G02F 1/1333*    (2006.01)
*G02F 1/1335*    (2006.01)
*G02F 1/1339*    (2006.01)

(52) U.S. Cl.
CPC ...... *G02F 1/133514* (2013.01); *G02F 1/13394* (2013.01); *G02F 1/133512* (2013.01); *G02F 1/133371* (2013.01); *G02F 2201/52* (2013.01)

(58) Field of Classification Search
CPC ............... G02F 1/133514; G02F 1/133512; G02F 1/133371; G02F 2201/52
See application file for complete search history.

(56) References Cited

U.S. PATENT DOCUMENTS

2014/0293199 A1*    10/2014   Sakae et al. ............ 349/106

\* cited by examiner

*Primary Examiner* — Phu Vu
(74) *Attorney, Agent, or Firm* — Dentons US LLP

(57) ABSTRACT

Disclosed is a liquid crystal display (LCD) device that includes a lower substrate including a thin film transistor array; an upper substrate spaced apart from and facing the lower substrate; a black matrix formed on the upper substrate; a color filter formed on the black matrix; an overcoating layer formed on the color filter; and a column spacer positioned on the overcoating layer, wherein the color filter has a pattern protruding in a direction from a region where the column spacer is positioned to a side of an adjacent color filter.

11 Claims, 11 Drawing Sheets

LIQUID CRYSTAL DISPLAY DEVICE

CROSS-REFERENCE TO RELATED APPLICATIONS

This application claims the benefit of Korean Patent Application No. 10-2013-0104763 filed on Sep. 2, 2013, which is hereby incorporated by reference for all purposes as if fully set forth herein.

BACKGROUND OF THE INVENTION

1. Field of the Invention

The present invention relates to a liquid crystal display (LCD) device and method for manufacturing the same and, more particularly, to an LCD device that has an improved color sense and uniform cell gap.

2. Discussion of the Related Art

In accordance with development of informatization technologies, a market of a display device as a connection medium between a user and information is growing. Accordingly, the use of flat panel displays (FPD) such as a liquid crystal display (LCD), an organic light emitting diode (OLED), and a plasma display panel (PDP) is increased.

Among the flat panel displays, LCD devices, which are capable of embodying a high resolution and being reduced and increased in size, are extensively used. LCD devices displays an image in a mode where light incident from a backlight unit is emitted by adjusting an arrangement direction of a liquid crystal layer by an electric field applied to a pixel electrode and a common electrode included in a liquid crystal panel. LCD devices having various structures are separately manufactured in various driving modes according to a structure of a thin film transistor, a column spacer, a color filter, the pixel electrode, and the common electrode included in the liquid crystal panel.

Meanwhile, when the liquid crystal panel is manufactured according to the related art, an overlay margin between the column spacer and the color filter positioned in an adjacent region is not considered. Accordingly, there are differences in height of the color filters and in height of the column spacers. In this case, the liquid crystal panel has problems in that there are differences in color sense and cell gap in an entire surface or a local portion of a front surface of the display surface. Accordingly, the problems need to be overcome.

SUMMARY OF THE INVENTION

Accordingly, the present invention is directed to a liquid crystal display (LCD) device and method for manufacturing the same that substantially obviates one or more of the problems due to limitations and disadvantages of the related art.

An advantage of the present invention is to provide an LCD device that has an improved color sense and uniform cell gap.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device may, for example, includes a lower substrate including a thin film transistor array; an upper substrate spaced apart from and facing the lower substrate; a black matrix formed on the upper substrate; a color filter formed on the black matrix; an overcoating layer formed on the color filter; and a column spacer positioned on the overcoating layer, wherein the color filter has a pattern protruding in a direction from a region where the column spacer is positioned to a side of an adjacent color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

First Exemplary Embodiment

Figure 1:
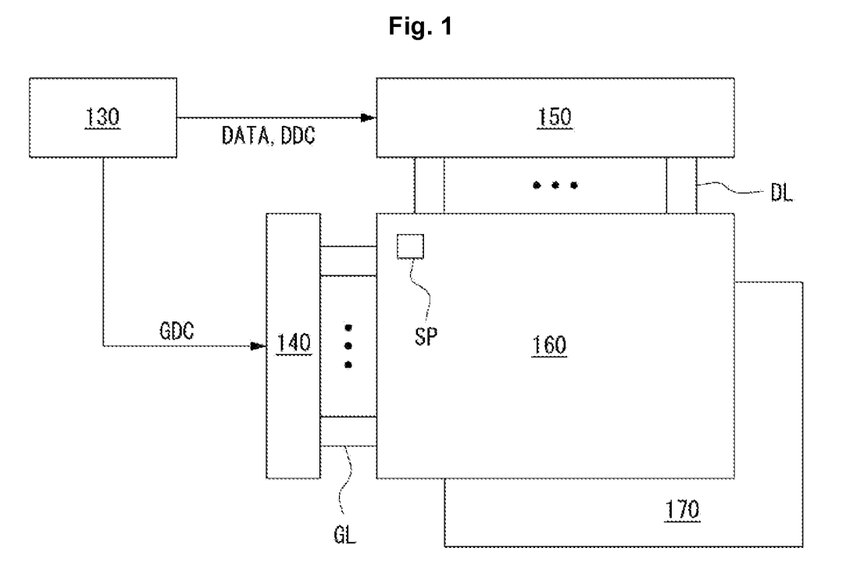
FIG. 1 is a block diagram schematically illustrating a liquid crystal display (LCD) device according to a first exemplary embodiment of the present invention.
Figure 2:
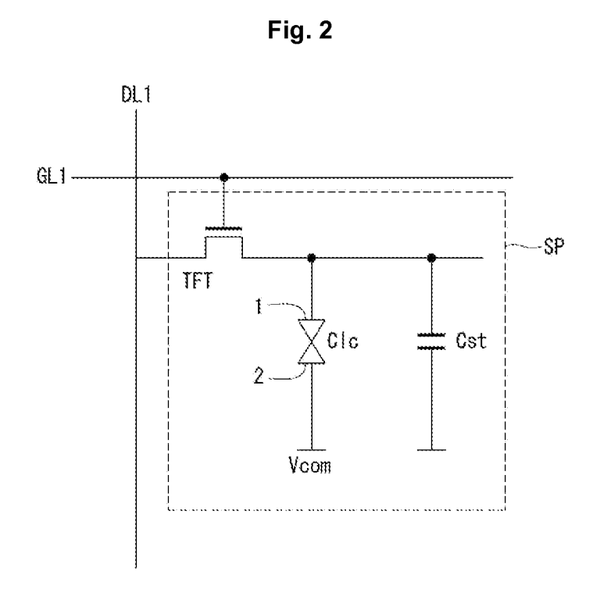
FIG. 2 is a circuit diagram schematically illustrating a sub-pixel shown in FIG. 1.

FIG. 1 is a block diagram schematically illustrating a liquid crystal display (LCD) device according to a first exemplary embodiment of the present invention. FIG. 2 is a circuit diagram schematically illustrating a sub-pixel shown in FIG. 1.

As illustrated in FIGS. 1 and 2, the LCD device includes a timing controller 130, a gate driver 140, a data driver 150, a liquid crystal panel 160, and a backlight unit 170.

The timing controller 130 receives a vertical synchronization signal Vsync, a horizontal synchronization signal, a data enable signal, a clock signal, and a data signal DATA from the outside. The timing controller 130 controls operation timing of the data driver 150 and the gate driver 140 by using timing signals such as the vertical synchronization signal, the horizontal synchronization signal, the data enable signal, and the clock signal.

The timing controller 130 may count the data enable signal during one horizontal period to determine a frame period. Accordingly, the vertical synchronization signal and the horizontal synchronization signal supplied from the outside may be omitted. The timing controller 130 generates a gate timing control signal GDC controlling operation timing of the gate driver 140, and a data timing control signal DDC controlling operation timing of the data driver 150.

The gate driver 140 responds to the gate timing control signal GDC supplied from the timing controller 130 to shift a level of a gate voltage and output a gate signal. The gate driver 140 supplies the gate signal through gate lines GL to the liquid crystal panel 160. The gate driver 140 is formed in an IC type, or in a gate-in-panel mode in the liquid crystal panel 160.

The data driver 150 responds to the data timing control signal DDC supplied from the timing controller 130 to sample and latch the data signal DATA, convert the data signal DATA into data voltage using a gamma reference voltage, and output the data voltage. The data driver 150 supplies the data voltage through data lines DL to the liquid crystal panel 160. The data driver 150 is formed in an IC type.

The backlight unit 170 supplies light to the liquid crystal panel 160. The backlight unit 170 includes light emitting diodes (hereinafter, referred to as "LEDs"), a LED driver driving the LEDs, a light guide plate converting light emitted from the LEDs into a surface light source, and optical sheets collecting and diffusing light emitted from the light guide plate. The backlight unit 170 may supply light to the liquid crystal panel 160 in a mode where the LEDs and another light source are used.

The liquid crystal panel 160 is constituted by a lower substrate on which a thin film transistor is formed, an upper substrate on which a color filter is formed, and a liquid crystal layer positioned therebetween. An alignment film setting a pre-tilt angle of liquid crystal is formed on the lower substrate and an internal upper layer of the lower substrate. A lower polarizer is attached to a lower surface of the lower substrate. An upper polarizer is attached to an upper surface of the upper substrate.

The liquid crystal panel 160 may be embodied by any type of a transmissive liquid crystal display, a semi-transmissive liquid crystal display and a reflective liquid crystal display. The liquid crystal panel 160 responds to the gate signal supplied from the gate driver 140 and the data signal DATA supplied from the data driver 150 to display an image. The liquid crystal panel 160 includes sub-pixels controlling light supplied from the backlight unit 170.

As illustrated in FIG. 2, one sub-pixel SP includes a thin film transistor TFT, a storage capacitor Cst, and a liquid crystal layer Clc. A gate electrode of the thin film transistor TFT is connected to a gate line GL1. A source electrode is connected to a data line DL1. The storage capacitor Cst is connected to a drain electrode of the thin film transistor TFT at an end thereof and to a common voltage line Vcom at another end thereof. The liquid crystal layer Clc is formed between a pixel electrode 1 connected to the drain electrode of the thin film transistor TFT and a common electrode 2, Vcom.

Hereinafter, the liquid crystal panel according to the first exemplary embodiment of the present invention will be described.

Figure 3:
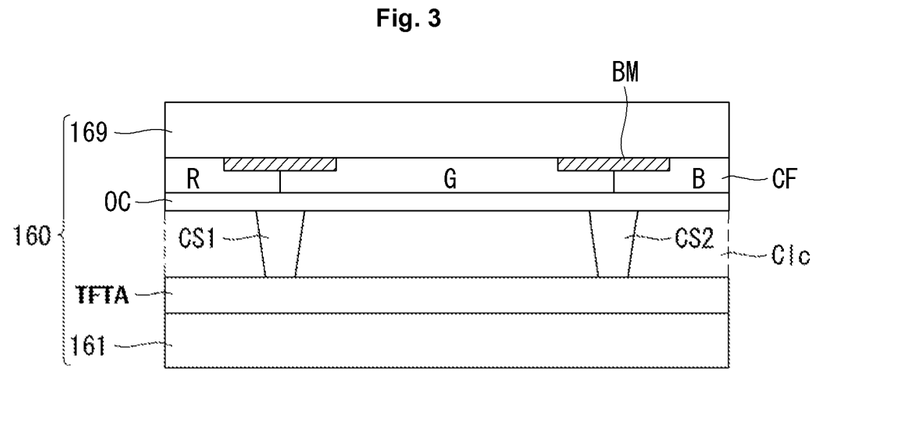
FIG. 3 is an exemplified cross-sectional view of a liquid crystal panel according to the first exemplary embodiment of the present invention.
Figure 4:
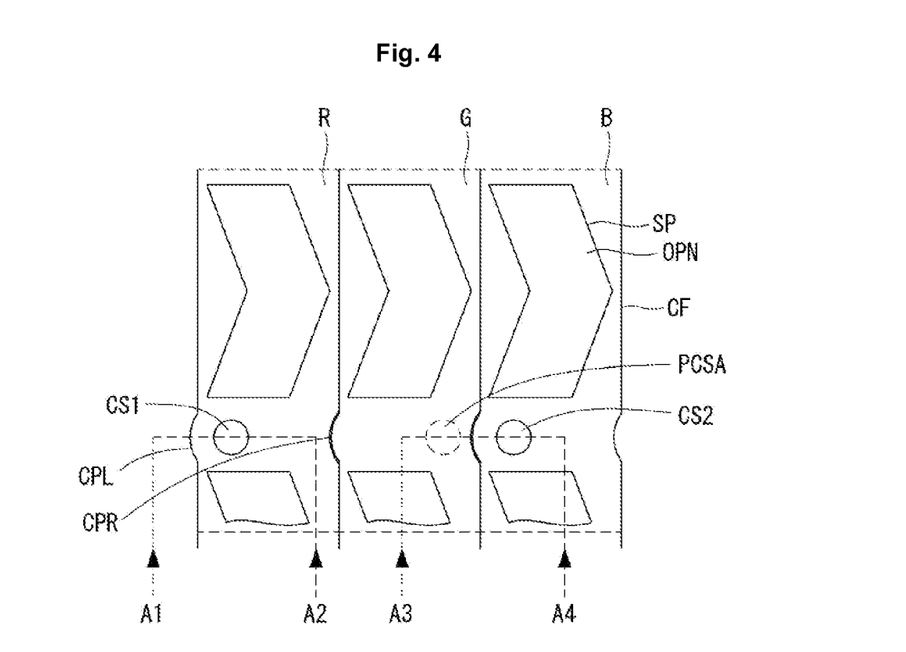
FIG. 4 is an exemplified top-plan view illustrating an internal surface of an upper substrate of the liquid crystal panel of FIG. 3.
Figure 5:
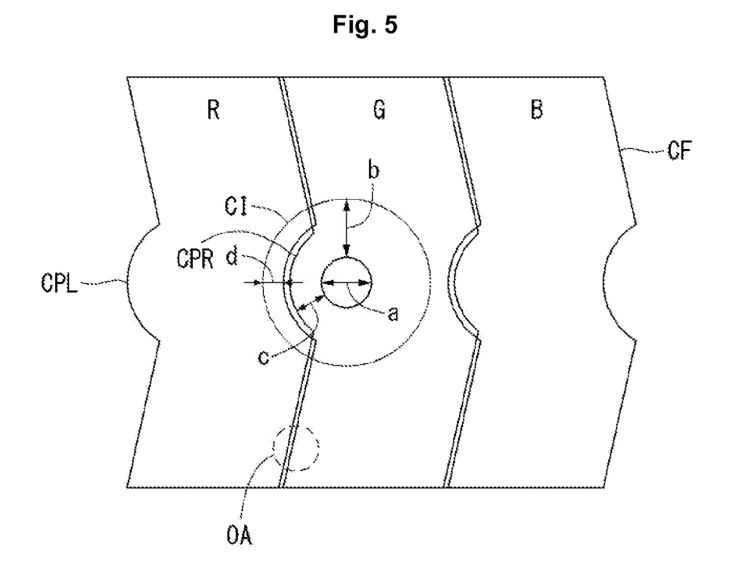
FIG. 5 is a view specifically illustrating color filter and column spacer portions.
Figure 6:
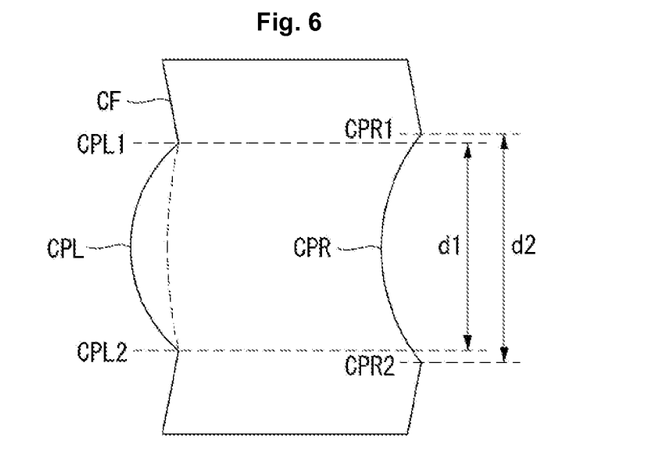
FIG. 6 is a view specifically illustrating a structure of the color filter.
Figure 7:
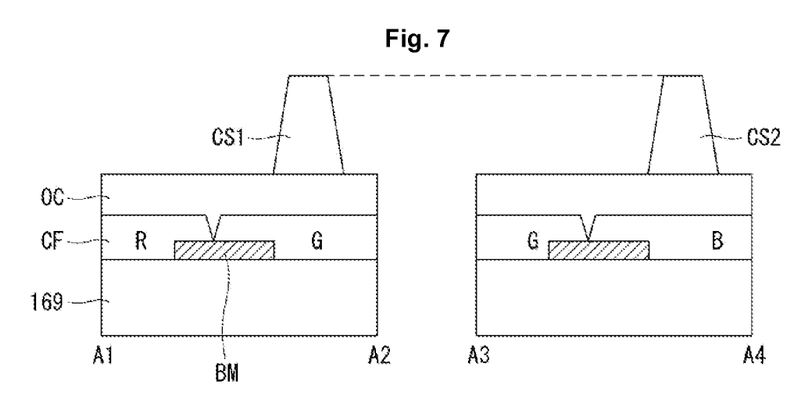
FIG. 7 is a view illustrating a structural effect according to the first exemplary embodiment of the present invention.

FIG. 3 is an exemplified cross-sectional view of the liquid crystal panel according to the first exemplary embodiment of the present invention. FIG. 4 is an exemplified top-plan view illustrating an internal surface of the upper substrate of the liquid crystal panel of FIG. 3. FIG. 5 is a view specifically illustrating color filter and column spacer portions. FIG. 6 is a view specifically illustrating a structure of the color filter. FIG. 7 is a view illustrating a structural effect according to the first exemplary embodiment of the present invention.

As illustrated in FIGS. 3 and 4, a thin film transistor array TFTA is formed on a lower substrate 161. The thin film transistor array TFTA includes the thin film transistor TFT and the storage capacitor Cst illustrated in FIG. 2. For example, the thin film transistor TFT can be constituted in a top gate mode or a bottom gate mode. The thin film transistor TFT may include the gate electrode, a semiconductor layer, the source electrode, and the drain electrode. The semiconductor layer may be formed of any one selected from amorphous silicon, polysilicon, oxides and organic materials.

The thin film transistor array TFTA may be formed to have various structures according to a shape of the thin film transistor TFT, the storage capacitor Cst, the pixel electrode, and the common electrode (the presence of the common electrode). Accordingly, the thin film transistor array TFTA is schematically shown by a block.

A black matrix BM is formed on an upper substrate 169. The black matrix BM is formed to cover a region other than an opening region OPN of the sub-pixel SP. The black matrix BM serves to prevent light leakage from occurring in the region other than the opening region OPN. The black matrix BM may be formed of a resin including a black-based pigment.

A color filter CF is formed on the upper substrate 169 to expose a portion of the black matrix BM. The color filters CF having three colors of red, green, and blue colors (RGB) are separately formed. The color filter CF may be formed of a resin including a pigment converting white light supplied from the backlight unit into the red, green, and blue colors (RGB).

An overcoating layer OC is formed on the color filter CF. The overcoating layer OC serves to prevent a step formed due to a lower structure such as the color filter CF and planarize a surface. The overcoating layer OC may be formed of an organic material or an organic/inorganic complex material.

Column spacers CS1 and CS2 are formed on the overcoating layer OC. The column spacers CS1 and CS2 serves to maintain an interval (cell gap) between the lower substrate 161 and the upper substrate 169 constituting the liquid crystal panel 160. The column spacers CS1 and CS2 may be formed of an organic material.

The column spacers CS1 and CS2 may be formed of the same material as the overcoating layer OC or a layer that is different from the overcoating layer OC, and then patterned. The column spacers CS1 and CS2 are formed to correspond to a position of the thin film transistor of the lower substrate 161 (particularly, a region corresponding to the gate electrode). Accordingly, when the lower substrate 161 and the upper substrate 169 are bonded, the column spacers CS1 and CS2 correspond to the position of the thin film transistor of the lower substrate 161 (particularly, the region corresponding to the gate electrode).

A push column spacer, which serves to protect an internal structure from pressure generated due to pressing of the liquid crystal panel 160 and prevent light leakage inferiority, may be positioned on the lower substrate 161 and the upper substrate 169 constituting the liquid crystal panel 160. Although not shown in the drawings, the push column spacer may be formed on an uppermost portion of the lower substrate 161 or an uppermost portion of the upper substrate 169. As described above, the position of the push column spacer may be changed according to a manufacturing mode. Accordingly, in the present invention, a region where the push column spacer is positioned is designated by "PCSA" and a structure thereof is not shown.

Meanwhile, the color filter CF has patterns CPL and CPR where red, green, and blue resins protrude in one side direction. The protruding patterns CPL and CPR of the color filter CF are formed in regions where the column spacers CS1 and CS2 are positioned. The protruding patterns CPL and CPR of the color filter CF are formed to protrude in one side direction of the adjacent color filter. The protruding patterns CPL and CPR of the color filter CF may come into contact with or be partially overlaid with the adjacent color filter. A description of the protruding patterns CPL and CPR of the color filter CF will be given below.

As illustrated in FIGS. 5 and 6, the protruding patterns CPL and CPR of the color filter CF are provided by the color filter CF positioned in a region that is adjacent to the column spacers CS1 and CS2. The protruding patterns CPL and CPR of the color filter CF are present in all color filters CF formed in the regions or lines where the column spacers CS1 and CS2 are positioned.

The protruding patterns CPL and CPR formed between a R color filter CF and a G color filter CF based on the R color filter CF and the G color filter CF will be specifically described below.

A protrusion unit CPL having a portion protruding in a direction to the adjacent color filter CF is formed on a side (left side of the drawing) of each of the R color filter CF and the G color filter CF. In addition, a recess unit CPR having a portion recessed so that the protrusion unit CPL of the adjacent color filter CF is received is formed on another side (right side of the drawing) of each of the R color filter CF and the G color filter CF.

The protruding patterns CPL and CPR of the color filter CF are provided to prevent or reduce a problem relating a process allowance in the regions where the column spacers CS1 and CS2 are formed (a problem of the occurrence of a height difference between the column spacers). Accordingly, the protrusion unit CPL and the recess unit CPR may have a hemisphere shape corresponding to shapes of the column spacers CS1 and CS2 and be spaced apart from each other, but the shape is not limited thereto.

Sizes of the protrusion unit CPL and the recess unit CPR may be designed based on a design margin. The design margin is defined by a virtual circle CI drawn based on the column spacers CS1 and CS2. The virtual circle CI is defined by a range b corresponding to an end of an opening region of a sub-pixel (end of a lower side of the sub-pixel) positioned on upper portions of the column spacers CS1 and CS2 and an end of an opening region of a sub-pixel positioned (end of an upper side of the sub-pixel) on a lower portion.

The protrusion unit CPL and the recess unit CPR are formed to be spaced apart from each other in the virtual circle CI. A protrusion size of the protrusion unit CPL is defined by a distance c between the protrusion unit CPL and the column spacers CS1 and CS2 spaced apart therefrom. The distance c defining the protrusion size of the protrusion unit CPL corresponds to or is smaller than a diameter a of the column spacers CS1 and CS2. A recess size of the recess unit CPR is defined by a distance d between the recess unit CPR and the virtual circle CI spaced apart therefrom. The distance d defining the recess size of the recess unit CPR is smaller than the distance c defining the protrusion size of the protrusion unit CPL.

A distance d1 between a first protrusion point CPL1 and a second protrusion point CPL2 forming the protrusion unit CPL is smaller than or the same as a distance d2 between a first recess point CPR1 and a second recess point CPR2 forming the recess unit CPR. Accordingly, the protrusion size of the protrusion unit CPL is smaller than or the same as the recess size of the recess unit CPR. The protrusion unit CPL is received into a recess region of the recess unit CPR. Meanwhile, in the drawings, d1 is smaller than d2 so that the protrusion unit CPL and the recess unit CPR beneficially come into contact with each other. However, d1 may be the same as d2.

The color filter CF is formed in R color filter CF, G color filter CF, and B color filter CF types by a patterning process using a photoresist and a mask. Accordingly, when an error of the process (mask shift) occurs, there is a problem in that at least one color filter of RGB is overlaid with another color filter.

The protruding patterns CPL and CPR are formed in the color filters CF positioned in the regions adjacent to the column spacers CS1 and CS2. On the other hand, an overlay unit OA may be formed in the color filter CF positioned in the region adjacent to the opening region. The reason is that in the case of the opening region not adjacent to the column spacers CS1 and CS2, even though overlaying occurs between the color filters CF, a problem such as the occurrence of the height difference between the column spacers CS1 and CS2 may not be present.

As illustrated in FIGS. 5 to 7, when the protruding patterns CPL and CPR are formed in the color filter CF, even though the adjacent color filters R and G or G and B are overlaid with each other, a probability of the occurrence of a height difference between first and second column spacers CS1 and CS2 may be reduced or prevented. The reason is that the protrusion unit CPL and the recess unit CPR of the color filter CF are positioned to be spaced apart from the column spacers CS1 and CS2 at a long distance. Further, this is because an overlay margin that can take into account the process allowance and prevent or reduce overlaying of the color filters CF is formed in the protruding patterns CPL and CPR of the color filter CF.

In connection with this, the present invention will be described below in comparison with the related art.

Figure 8:
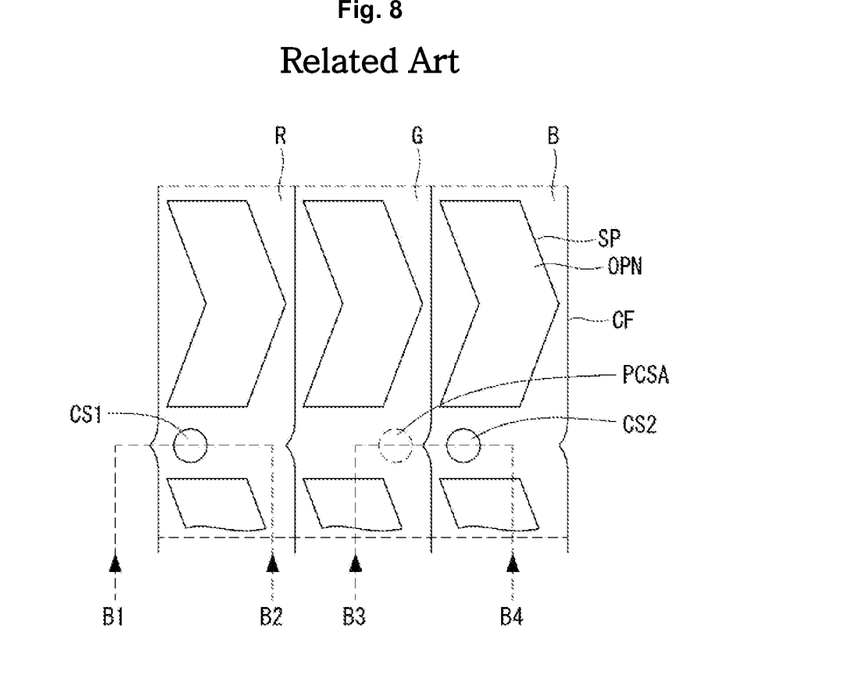
FIG. 8 is an exemplified top-plan view showing an internal surface of an upper substrate of a related art liquid crystal panel.
Figure 9:
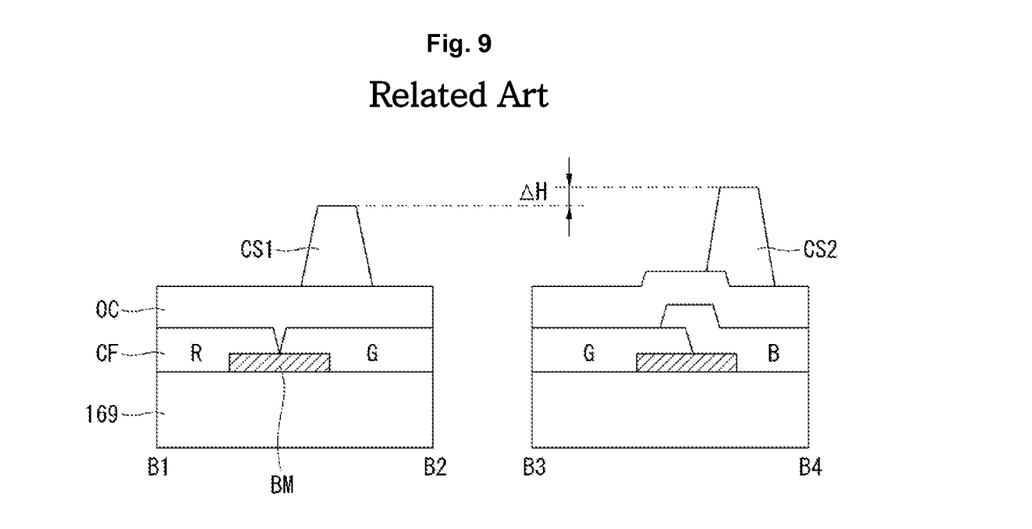
FIG. 9 is a view illustrating a structural problem of the related art liquid crystal panel.

FIG. 8 is an exemplified top-plan view illustrating an internal surface of an upper substrate of a known liquid crystal panel. FIG. 9 is a view showing a structural problem of the known liquid crystal panel.

As shown in FIGS. 8 and 9, in a color filter CF formed in the known liquid crystal panel, regions adjacent to column spacers CS1 and CS2 protrude. However, there is no design margin or no overlay margin that takes into account the process allowance. Accordingly, in the known liquid crystal panel, when the color filters CF positioned in the regions adjacent to the column spacers CS1 and CS2 are overlaid with each other, a height difference ΔH occurs between first and second column spacers CS1 and CS2. Accordingly, in the case of the known liquid crystal panel, there are differences in color sense and cell gap in an entire surface or a local portion of the front surface of the display surface.

On the other hand, as illustrated in FIGS. 4 to 7, in the color filter CF formed in the liquid crystal panel according to the first exemplary embodiment of the present invention, there is a margin that can take into account the process allowance by using the protrusion unit CPL and the recess unit CPR. Accordingly, the liquid crystal panel according to the first exemplary embodiment of the present invention may prevent or reduce a probability of the occurrence of the height difference between the first and second column spacers CS1 and CS2 even when the adjacent color filters R and G or G and B are overlaid with each other. Accordingly, in the case of the liquid crystal panel according to the first exemplary embodiment of the present invention, the problems that there are differences in color sense and cell gap in the entire surface or the local portion of the front surface of the display surface may be solved.

Second Exemplary Embodiment

Figure 10:
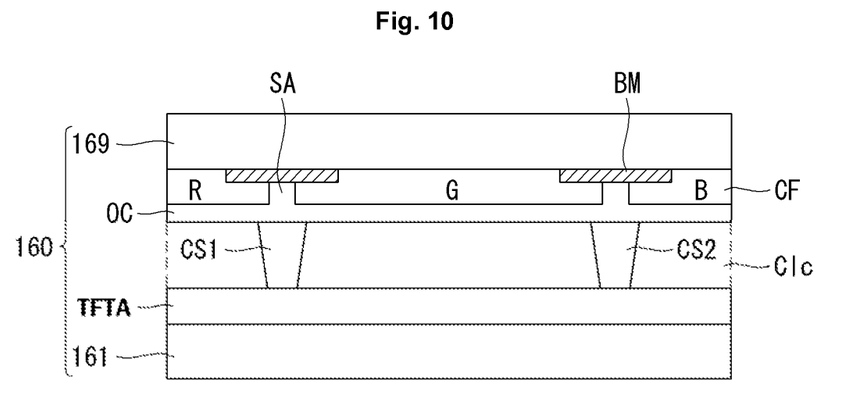
FIG. 10 is an exemplified cross-sectional view of a liquid crystal panel according to a second exemplary embodiment of the present invention.
Figure 11:
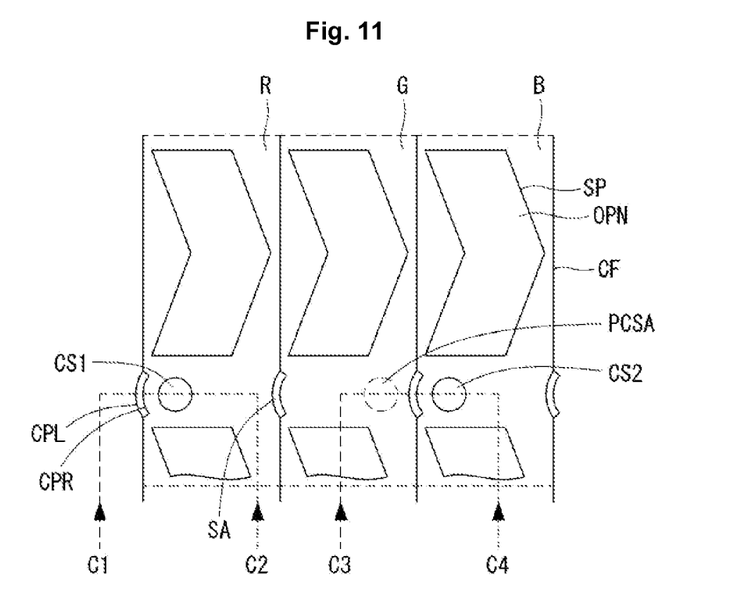
FIG. 11 is an exemplified top-plan view illustrating an internal surface of an upper substrate of the liquid crystal panel of FIG. 10.
Figure 12:
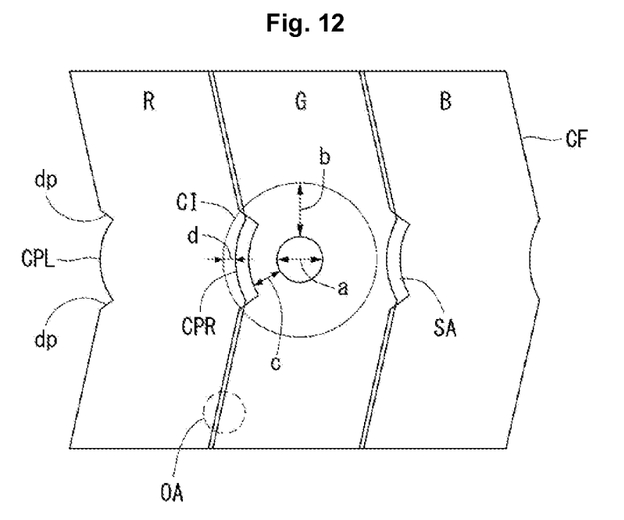
FIG. 12 is a view illustrating color filter and column spacer portions.
Figure 13:
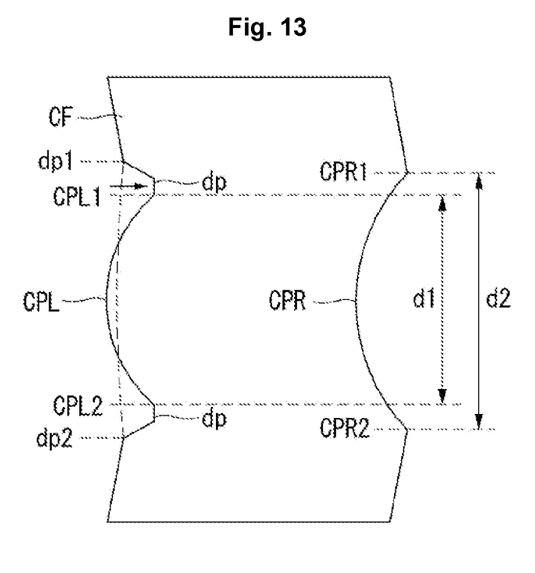
FIG. 13 is a view specifically illustrating a structure of the color filter.
Figure 14:
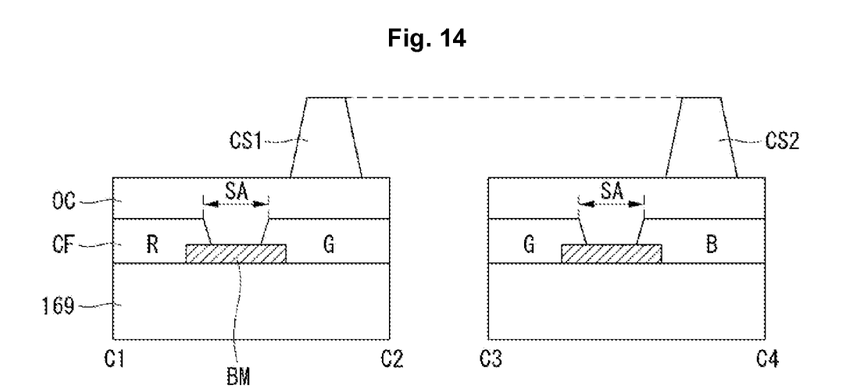
FIG. 14 is a view illustrating a structural effect according to the second exemplary embodiment of the present invention.

FIG. 10 is an exemplified cross-sectional view illustrating a liquid crystal panel according to a second exemplary embodiment of the present invention. FIG. 11 is an exemplified top-plan view illustrating an internal surface of an upper substrate of the liquid crystal panel of FIG. 10. FIG. 12 is a view illustrating color filter and column spacer portions. FIG. 13 is a view specifically illustrating a structure of the color filter. FIG. 14 is a view illustrating a structural effect according to the second exemplary embodiment of the present invention.

As illustrated in FIGS. 10 and 11, a thin film transistor array TFTA is formed on a lower substrate 161. The thin film transistor array TFTA includes the thin film transistor TFT and the storage capacitor Cst shown in FIG. 2. The thin film transistor array TFTA may be formed to have various structures according to a shape of the thin film transistor TFT, the storage capacitor Cst, a pixel electrode, and a common electrode (the presence of the common electrode). Accordingly, the thin film transistor array TFTA is schematically shown.

A black matrix BM is formed on an upper substrate 169. The black matrix BM is formed to cover a region other than an opening region OPN of a sub-pixel SP. The black matrix BM serves to prevent light leakage from occurring in the region other than the opening region OPN. The black matrix BM may be formed of a resin including a black-based pigment.

A color filter CF is formed on the upper substrate 169 to expose a portion of the black matrix BM. The color filters CF having three colors of red, green, and blue colors (RGB) are separately formed. The color filter CF may be formed of a resin including a pigment converting white light supplied from a backlight unit into the red, green, and blue colors (RGB).

An overcoating layer OC is formed on the color filter CF. The overcoating layer OC serves to prevent a step formed due to a lower structure such as the color filter CF and planarize a surface. The overcoating layer OC may be formed of an organic material or an organic/inorganic complex material.

Column spacers CS1 and CS2 are formed on the overcoating layer OC. The column spacers CS1 and CS2 serve to maintain an interval (cell gap) between the lower substrate 161 and the upper substrate 169 constituting a liquid crystal panel 160. The column spacers CS1 and CS2 may be formed of an organic material. The column spacers CS1 and CS2 may be formed of the same material as the overcoating layer OC or a layer that is different from the overcoating layer OC, and then patterned. The column spacers CS1 and CS2 are formed to correspond to a position of a thin film transistor of the lower substrate 161 (particularly, a region corresponding to a gate electrode). Accordingly, when the lower substrate 161 and the upper substrate 169 are bonded, the column spacers CS1 and CS2 correspond to the position of the thin film transistor of the lower substrate 161 (particularly, the region corresponding to the gate electrode).

A push column spacer, which serves to protect an internal structure from pressure generated due to pressing of the liquid crystal panel 160 and prevent light leakage inferiority, is positioned on the lower substrate 161 and the upper substrate 169 constituting the liquid crystal panel 160. Although not shown in the drawings, the push column spacer is formed on an uppermost portion of the lower substrate 161 or an uppermost portion of the upper substrate 169. As described above, the position of the push column spacer may be changed according to a manufacturing mode. Accordingly, in the present invention, a region where the push column spacer is positioned is designated by "PCSA" and a structure thereof is not shown.

Meanwhile, the color filter CF includes a space unit SA provided so that red, green, and blue resins are spaced apart from each other. A description relating to the space unit SA will be given below.

As illustrated in FIGS. 11 to 13, the space unit SA is provided by the color filters CF positioned in regions adjacent to the column spacers CS1 and CS2. The space unit SA may be present only in the regions adjacent to the column spacers CS1 and CS2. However, for explanation purposes, the presence of the space unit SA in all color filters CF formed in a region or a line where the column spacers CS1 and CS2 are positioned is shown and described as an example.

The space unit SA formed between a R color filter CF and a G color filter CF based on the R color filter CF and the G color filter CF will be specifically described below.

A protrusion unit CPL having a portion protruding in a direction to the adjacent color filter CF and a dummy recess unit dp having a portion recessed so that the protrusion unit is received in a direction to the column spacers CS1 and CS2 from upper and lower portions of the protrusion unit CPL are formed on one side (left side of the drawing) of the R color filter CF and the G color filter CF, respectively. In addition, a recess unit CPR recessed so that the protrusion unit CPL of the adjacent color filter CF is received is formed on another side (right side of the drawing) of each of the R color filter CF and the G color filter CF. Accordingly, the space unit SA is formed by the protrusion unit CPL, the dummy recess unit dp, and the recess unit CPR provided in the color filter CF.

The space unit SA is a space provided to prevent or reduce a problem relating to a process allowance in regions where the column spacers CS1 and CS2 are formed (a problem of the occurrence of a height difference between the column spacers). Accordingly, the protrusion unit CPL and the recess unit CPR constituting the space unit SA may have a hemisphere shape corresponding to shapes of the column spacers CS1 and CS2 and be spaced apart from each other, but the shape is not limited thereto.

Sizes of the protrusion unit CPL and the recess unit CPR may be designed based on a design margin. The design margin is defined by a virtual circle CI drawn based on the column spacers CS1 and CS2. The virtual circle CI is defined by a range b corresponding to an end of an opening region of a sub-pixel (end of a lower side of the sub-pixel) positioned on upper portions of the column spacers CS1 and CS2 and an end of an opening region of a sub-pixel positioned (end of an upper side of the sub-pixel) on a lower portion.

The protrusion unit CPL and the recess unit CPR are formed to be spaced apart from each other in the virtual circle CI. A protrusion size of the protrusion unit CPL is defined by a distance c between the protrusion unit CPL and the column spacers CS1 and CS2 spaced apart therefrom. The distance c defining the protrusion size of the protrusion unit CPL corresponds to or is smaller than a diameter a of the column spacers CS1 and CS2. A recess size of the recess unit CPR is defined by a distance d between the recess unit CPR and the virtual circle CI spaced apart therefrom. The distance d defining the recess size of the recess unit CPR is smaller than the distance c defining the protrusion size of the protrusion unit CPL.

The dummy recess unit dp is formed in the virtual circle CI. The dummy recess unit dp is formed between an upper recess point dp1 positioned over a first protrusion point CPL1 and the first protrusion point CPL1, and between a lower recess point dp2 positioned beneath a second protrusion point CPL2 and the second protrusion point CPL2. A starting point of the upper recess point dp1 may correspond to a first recess point CPR1 forming the recess unit CPR or be positioned over the first recess point CPR1. A starting point of the lower recess point dp2 may correspond to a second recess point CPR2 forming the recess unit CPR or be positioned beneath the second recess point CPR2.

Meanwhile, the drawings show that the dummy recess unit dp is formed of a straight-line type including two straight-line segments as an example. However, the dummy recess unit dp may be formed of a curved-line type depending on the precision of exposure or developing.

A distance d1 between the first protrusion point CPL1 and the second protrusion point CPL2 forming the protrusion unit CPL is smaller than a distance d2 between the first recess point CPR1 and the second recess point CPR2 forming the recess unit CPR. Accordingly, the protrusion size of the protrusion unit CPL is smaller than the recess size of the recess unit CPR. The protrusion unit CPL is received into a recess region of the recess unit CPR and forms the space unit SA together with the recess unit CPR.

The color filter CF is formed in R color filter CF, G color filter CF, and B color filter CF types by a patterning process using a photoresist and a mask. Accordingly, when an error of the process (mask shift) occurs, there is a problem in that at least one color filter of RGB is overlaid with another color filter.

The space unit SA is formed in the color filters CF positioned in the regions adjacent to the column spacers CS1 and CS2. On the other hand, an overlay unit OA may be formed in the color filter CF positioned in a region adjacent to the opening region. The reason is that in the case of the opening region not adjacent to the column spacers CS1 and CS2, even though overlaying occurs between the color filters CF, a problem such as the occurrence of the height difference between the column spacers CS1 and CS2 may not be present.

As illustrated in FIGS. 10 to 14, when the space unit SA is formed in the color filter CF, even when the adjacent color filters R and G or G and B are overlaid with each other, a probability of the occurrence of a height difference between first and second column spacers CS1 and CS2 may be reduced or prevented. The reason is that the protrusion unit CPL and the recess unit CPR of the color filter CF are positioned to be spaced apart from the column spacers CS1 and CS2 at a long distance.

Further, this is because an overlay margin that can take into account the process allowance and prevent or reduce overlaying of the color filters CF is formed in the space unit SA provided by the protrusion unit CPL and the recess unit CPR of the color filter CF. Accordingly, in the case of the liquid crystal panel according to the second exemplary embodiment of the present invention, the problems that there are differences in color sense and cell gap in an entire surface or a local portion of the front surface of the display surface may be solved.

Meanwhile, in the second exemplary embodiment of the present invention, the protrusion unit CPL is formed from a region where the dummy recess unit dp is formed. Accordingly, a wider space unit SA may be formed as compared to the first exemplary embodiment of the present invention. Accordingly, a phenomenon of overlaying of the color filters CF positioned in the regions adjacent to the first and second column spacers CS1 and CS2 may be prevented or reduced. Accordingly, uniformity of the overcoating layer positioned on an upper portion of the color filter CF and uniformity of the first and second column spacers CS1 and CS2 may be secured.

Examples of a sub-pixel structure according to the present invention will be described. FIGS. 15 to 19 are exemplified structural views of a sub-pixel structure according to the present invention.

Figure 15:
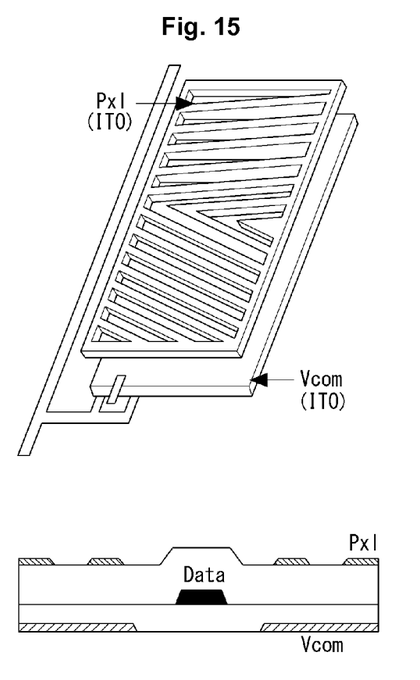
FIGS. 15 to 19 are exemplified structural views illustrating a sub-pixel according to the present invention.

FIG. 15 illustrates a sub-pixel structure where a pixel electrode Px1 is formed on an upper portion of a common electrode Vcom. The common electrode Vcom and the pixel electrode Px1 are formed of a transparent electrode (e.g.: ITO). In the sub-pixel illustrated in FIG. 15, the common electrode Vcom is formed to correspond to the opening region, and the pixel electrode Px1 is formed in a split electrode type. Herein, the common electrode Vcom is formed on a lower portion of a vertical data wire Data. In addition, the pixel electrode Px1 includes an electrode having a shape of inequality sign (<) at the center of the opening region and an electrode having a shape of diagonal lines vertically symmetric based on the electrode having the shape of inequality sign.

Figure 16:
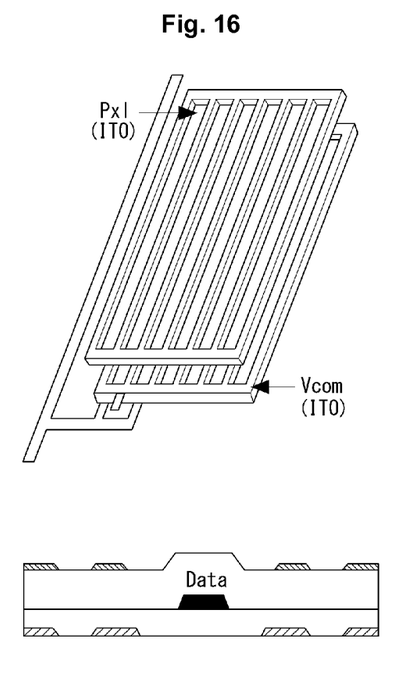

FIG. 16 illustrates a sub-pixel structure where the pixel electrode Px1 is formed on the upper portion of the common electrode Vcom. The common electrode Vcom and the pixel electrode Px1 are formed of the transparent electrode (e.g.: ITO). In the sub-pixel illustrated in FIG. 16, the common electrode Vcom and the pixel electrode Px1 are formed in the split electrode type. Herein, the common electrode Vcom is formed on the lower portion of the vertical data wire Data. In addition, the pixel electrode Px1 includes an electrode having a vertically split shape in the opening region.

Figure 17:
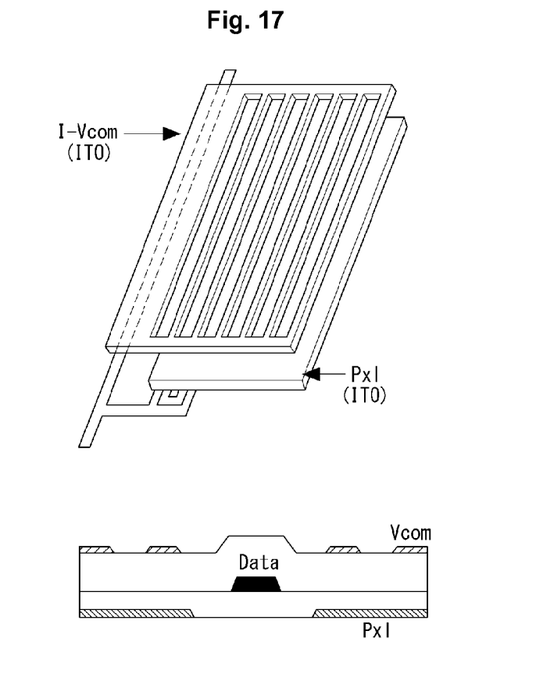

FIG. 17 illustrates a sub-pixel structure where the common electrode Vcom is formed on an upper portion of the pixel electrode Px1. The common electrode Vcom and the pixel electrode Px1 are formed of the transparent electrode (e.g.: ITO). In the sub-pixel illustrated in FIG. 17, the pixel electrode Px1 is formed to correspond to the opening region, and the common electrode Vcom is formed in the split electrode type. Herein, the pixel electrode Px1 is formed on the lower portion of the vertical data wire Data. In addition, the common electrode Vcom includes the electrode having the vertically split shape in the opening region.

Figure 18:
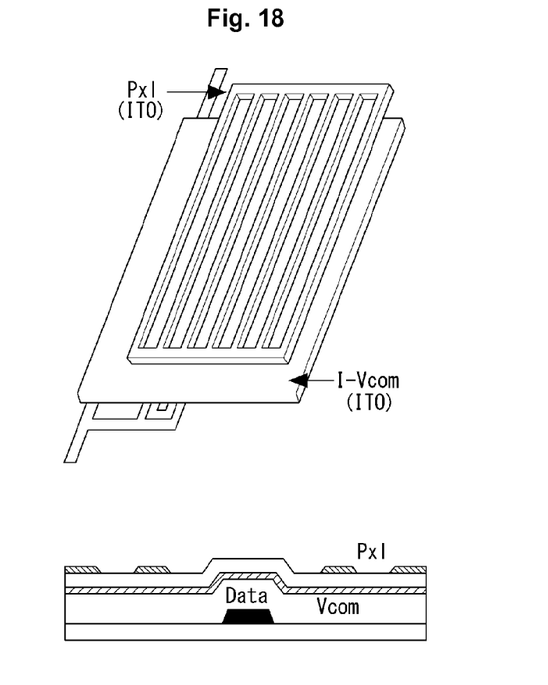

FIG. 18 illustrates a sub-pixel where the pixel electrode Px1 is formed on the upper portion of the common electrode Vcom. The common electrode Vcom and the pixel electrode Px1 are formed of the transparent electrode (e.g.: ITO). In the sub-pixel illustrated in FIG. 18, the common electrode Vcom is formed in a front electrode type, and the pixel electrode Px1 is formed in the split electrode type. Herein, the common electrode Vcom is formed between an upper portion of the vertical data wire Data and the pixel electrode Px1. In addition, the pixel electrode Px1 includes the electrode having the vertically split shape in the opening region.

Figure 19:
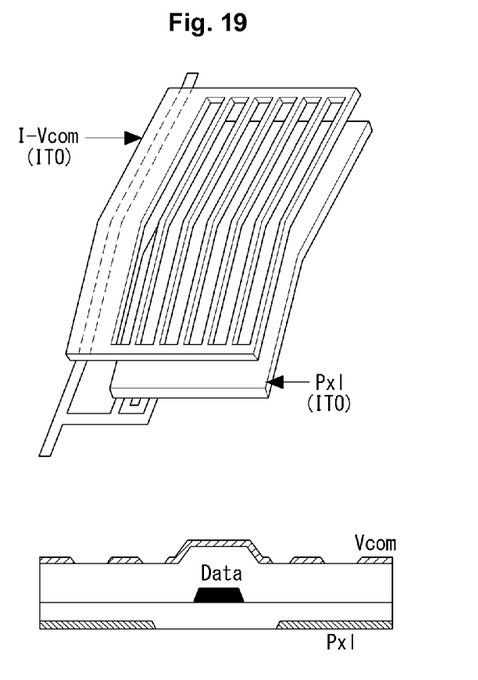

FIG. 19 illustrates a sub-pixel where the common electrode Vcom is formed on the upper portion of the pixel electrode Px1. The common electrode Vcom and the pixel electrode Px1 are formed of the transparent electrode (e.g.: ITO). In the sub-pixel illustrated in FIG. 19, the pixel electrode Px1 is formed to correspond to the opening region, and the common electrode Vcom is formed in the split electrode type. In addition, the common electrode Vcom includes the electrode having the vertically split shape in the opening region and the shape of inequality sign (<).

Meanwhile, in the above description, only several exemplary structures of a FFS (fringe field switching) mode or an IPS (in plane switching) mode of sub-pixels are described. However, it should be understood that the principles of the present invention can be applicable to sub-pixel structures operated in other modes, such as a TN (twisted nematic) mode and a VA (vertical alignment) mode, in addition to the aforementioned structures. Meanwhile, the reference characters "I-Vcom" shown in FIGS. 17 to 19 are the same as the common electrode Vcom. However, unlike FIGS. 15 and 16, I-Vcom in FIGS. 17 to 19 is partially overlaid with the data wire Data, and thus the different reference characters "I-Vcom" are used for this distinction.

The present invention is to provide an LCD device and method for manufacturing the same that can solve problems relating to differences in color sense and cell gap in an entire surface or a local portion of the front surface of the display surface by forming an overlay margin between color filters, and that can improve uniformity of the color filters, an overcoating layer, and a column spacer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a lower substrate including a thin film transistor array;
an upper substrate spaced apart from and facing the lower substrate;
a black matrix formed on the upper substrate;
a color filter formed on the black matrix;
an overcoating layer formed on the color filter; and
a column spacer positioned on the overcoating layer,
wherein the color filter has a pattern protruding in a direction from a region where the column spacer is positioned to a side of an adjacent color filter.

2. The liquid crystal display of claim 1, wherein the pattern is provided by a protrusion unit positioned on the side of the color filter and having a portion protruding in a direction to the adjacent color filter, and a recess unit positioned on another side of the color filter and having a portion recessed so that the protrusion unit is received.

3. The liquid crystal display of claim 2, wherein the protrusion unit and the recess unit come into contact with each other to cover a black matrix, or have a space unit where the protrusion unit and the recess unit are spaced apart from each other to expose a portion of the black matrix.

4. The liquid crystal display of claim 3, wherein the space unit is a margin space preventing overlaying of color filters to increase uniformity of an overcoating layer positioned in a region adjacent to a column spacer and the column spacer.

5. The liquid crystal display of claim 2, wherein the protrusion unit and the recess unit have a hemisphere shape corresponding to a shape of a column spacer.

6. The liquid crystal display of claim 2, wherein a distance between a first protrusion point and a second protrusion point forming the protrusion unit is smaller than a distance between a first recess point and a second recess point forming the recess unit.

7. The liquid crystal display of claim 6, wherein the protrusion unit includes a dummy recess unit having a portion recessed so that the protrusion unit is received in a direction to a column spacer from upper and lower portions of the protrusion unit.

8. The liquid crystal display of claim 7, wherein the dummy recess unit is formed between an upper recess point positioned over a first protrusion point and the first protrusion point, and between a lower recess point positioned beneath a second protrusion point and the second protrusion point.

9. The liquid crystal display of claim 8, wherein a starting point of the upper recess point corresponds to a first recess point or is positioned over the first recess point, and a starting point of the lower recess point corresponds to a second recess point or is positioned beneath the second recess point.

10. The liquid crystal display of claim 7, wherein the dummy recess unit is formed of a straight-line type including at least two straight line segments or a curved-line type not including the straight line segments.

11. The liquid crystal display of claim 2, wherein the protrusion unit and the recess unit are positioned in a virtual circle drawn based on a column spacer, and the virtual circle is defined by a range corresponding to an end of an opening region of a sub-pixel positioned on an upper portion of the column spacer and an end of an opening region of a sub-pixel positioned on a lower portion.

* * * * *